US006537006B1

(12) United States Patent
Clark

(10) Patent No.: US 6,537,006 B1
(45) Date of Patent: Mar. 25, 2003

(54) PLASTIC FASTENER SYSTEM

(76) Inventor: Robert G. Clark, 1401 N. Pebble Beach Blvd., Sun City Center, FL (US) 33573

( * ) Notice: Subject to any disclaimer, the term of this patent is extended or adjusted under 35 U.S.C. 154(b) by 0 days.

(21) Appl. No.: 09/858,045

(22) Filed: May 15, 2001

Related U.S. Application Data

(60) Provisional application No. 60/249,889, filed on Nov. 17, 2000.

(51) Int. Cl.[7] .............................. F16B 39/02; F16B 1/00
(52) U.S. Cl. ........................ 411/82; 411/351; 411/82.3; 411/930
(58) Field of Search .................. 411/82, 82.2, 82.3, 411/258, 930, 338, 339, 907, 908, 351

(56) References Cited

U.S. PATENT DOCUMENTS

| | | | | |
|---|---|---|---|---|
| 953,298 A | * | 3/1910 | Schmidt ..................... 105/200 |
| 4,659,268 A | * | 4/1987 | Del Mundo et al. .......... 411/34 |
| 5,205,690 A | * | 4/1993 | Roth ........................... 411/180 |
| 5,222,988 A | * | 6/1993 | Riley ............................ 16/2.1 |
| 5,447,399 A | * | 9/1995 | Yoshida et al. ............. 411/383 |
| 5,549,620 A | * | 8/1996 | Bremer ....................... 411/338 |
| 5,672,036 A | * | 9/1997 | Medal ......................... 411/171 |
| 5,725,341 A | * | 3/1998 | Hofmeister ................. 411/258 |

* cited by examiner

*Primary Examiner*—Flemming Saether
*Assistant Examiner*—Jori Schiffman

(57) ABSTRACT

A fastener system for adhesively coupling non-threaded components comprises, in combination a rigid bolt. The bolt has a head externally. The bolt has a shaft internally. The head has a generally hemispherical exterior end with a cental axis. The head also has a generally planar interior end. The head further has a top and a bottom. The shaft is in a generally cylindrical shape with a central axis. The fastener system also comprises a nut. The nut has a generally hemispherical exterior end. The nut has a generally planar interior end. The nut further having a top and a bottom. The exterior end of the nut has a radially circular flat region. A recess is provided in the circular flat region of the exterior end. The recess is adapted to receive the shaft. An adhesive provides a secure coupling between the nut and bolt.

20 Claims, 4 Drawing Sheets

PLASTIC FASTENER SYSTEM

RELATED APPLICATION

The present application is base upon Disclosure Document No. 472,983 filed Apr. 24, 2000, and Provisional Application No. 60/249,889 filed Nov. 17, 2000.

BACKGROUND OF THE INVENTION

1. Field of the Invention

The present invention relates to a plastic fastener system and more particularly pertains to adhesively coupling non-threaded components.

2. Description of the Prior Art

The use of fastener systems of conventional designs and configurations is known in the prior art. More specifically, fastener systems of conventional designs and configurations previously devised and utilized for the purpose of fastening components through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,235,078 to Meisterhans discloses a nut and screw fastening. U.S. Pat. No. 3,179,143 to Schultz et al discloses an adhesive locked fastening device. U.S. Pat. No. 3,713,143 to B. W. Schultz discloses a fastener. U.S. Pat. No. 4,759,670 to Linder et al discloses a multi-purpose two-piece plastic fastener system. Lastly, U.S. Pat. No. 5,904,383 to van der Wal discloses a adhesively secured pump fastener system.

While these devices fulfill their respective, particular objectives and requirements, the aforementioned patents do not describe a plastic fastener system that allows for adhesively coupling non-threaded components.

In this respect, the plastic fastener system according to the present invention substantially departs from the conventional concepts and designs of the prior art, and in doing so provides an apparatus primarily developed for the purpose of adhesively coupling non-threaded components.

Therefore, it can be appreciated that there exists a continuing need for a new and improved plastic fastener system which can be used for adhesively coupling non-threaded components. In this regard, the present invention substantially fulfills this need.

SUMMARY OF THE INVENTION

In view of the foregoing disadvantages inherent in the known types of fastener systems of conventional designs and configurations now present in the prior art, the present invention provides an improved plastic fastener system. As such, the general purpose of the present invention, which will be described subsequently in greater detail, is to provide a new and improved plastic fastener system and method which has all the advantages of the prior art and none of the disadvantages.

To attain this, the present invention essentially comprises a rigid plastic bolt. The rigid plastic bolt has an integrally fabricated head externally. The rigid plastic bolt has a shaft. The head has a generally hemispherical exterior end. The head has a cental axis. The head also has a generally planar interior end. The head further has a top and a bottom. The exterior end of the head has a radially circular flat region. The top and bottom of the head each have a flat gripping region axially lying in a plane parallel with each other and parallel with the axis. The shaft of the bolt extends from the interior end of the head. The shaft has a generally smooth cylindrical shape. The shaft has a central axis. The shaft also has a flat face. The flat face extends the length of the shaft. The flat face lies in a plane parallel with the axis and parallel with the flat gripping regions. The shaft terminates with a vertical free surface. Next provided is a nut. The nut has a generally hemispherical exterior end. The nut also has a generally planar interior end. The nut further has a top and a bottom. The exterior end of the nut has a radially circular flat region. The top and bottom each have a flat gripping region axially lying in a plane parallel with each other and parallel with the axis. The nut has a recess in the interior end. The recess is in a generally circular configuration with a flat axial face. The flat axial face is adapted to receive the shaft. The shaft and the nut and their faces are sized and shaped whereby when the shaft of the bolt is inserted into the recess of the nut the various gripping regions of the nut and bolt and the flat portions of the shaft and aperture all lie in parallel planes. An adhesive is provided next. The adhesive lines the interior surface of the recess of the nut. In this manner, a secure coupling between the nut and bolt is provided when the nut and bolt are brought into contact with each other. Last provided is a fragile membrane. The fragile membrane is in a circular configuration with a periphery. The fragile membrane is attached to the interior face of the nut adjacent to the recess. The membrane is adapted to be positioned over the recess to prevent drying of the adhesive prior to use. The membrane is further adapted to be penetrated by the free surface of the shaft during operation and use to access the adhesive and couple the nut and bolt.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should nor be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plastic fastener system which has all of the advantages of the prior art fastener systems of conventional designs and configurations and none of the disadvantages.

It is another object of the present invention to provide a new and improved plastic fastener system which may be easily and efficiently manufactured and marketed.

It is further object of the present invention to provide a new and improved plastic fastener system which is of durable and reliable constructions.

An even further object of the present invention is to provide a new and improved plastic fastener system which is susceptible of a low cost of manufacture with regard to both materials and labor, and which accordingly is then susceptible of low prices of sale to the consuming public, thereby making such plastic fastener system economically available to the buying public.

Even still another object of the present invention is to provide a plastic fastener system for adhesively coupling non-threaded components.

Lastly, it is an object of the present invention to provide a new and improved fastener system for adhesively coupling non-threaded components comprises, in combination a rigid bolt. The bolt has a head externally. The bolt has a shaft internally. The head has a generally hemispherical exterior end with a cental axis. The head also has a generally planar interior end. The head further has a top and a bottom. The shaft is in a generally cylindrical shape with a central axis. The fastener system also comprises a nut. The nut has a generally hemispherical exterior end. The nut has a generally planar interior end. The nut further having a top and a bottom. The exterior end of the nut has a radially circular flat region. A recess is provided in the circular flat region of the exterior end. The recess is adapted to receive the shaft. An adhesive is also provided. The adhesive provides a secure coupling between the nut and bolt when they are brought into contact with each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
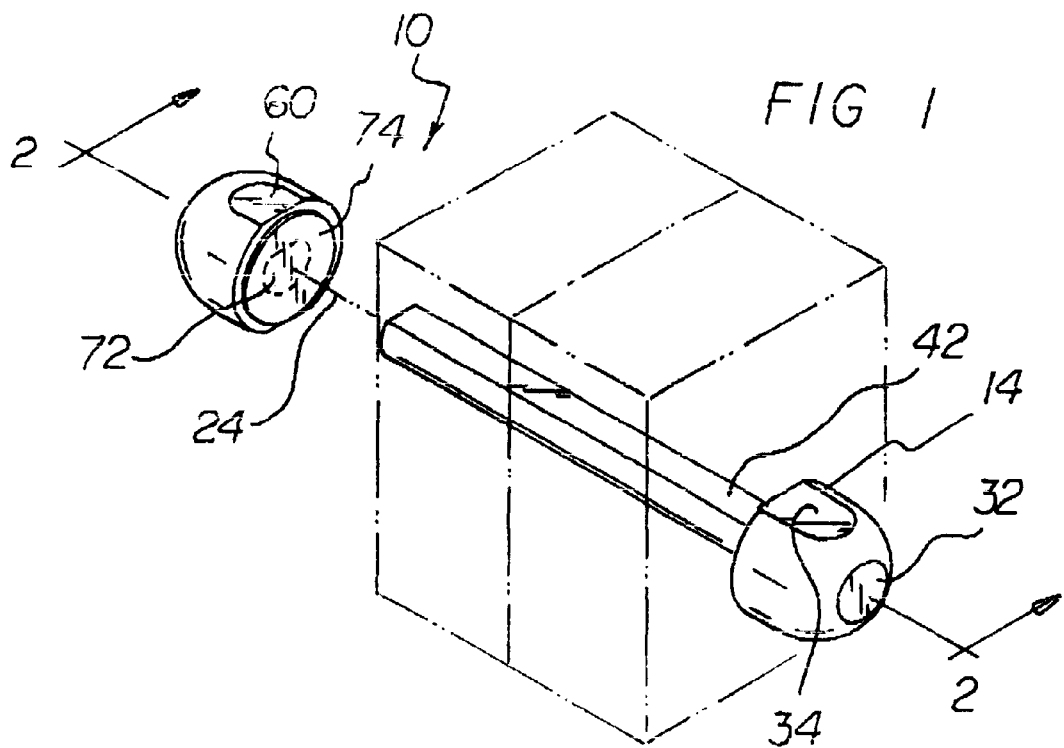
FIG. 1 is a perspective illustration of the preferred embodiment of the present invention and illustrating two apertured plates to be coupled by the fastener.
Figure 2:
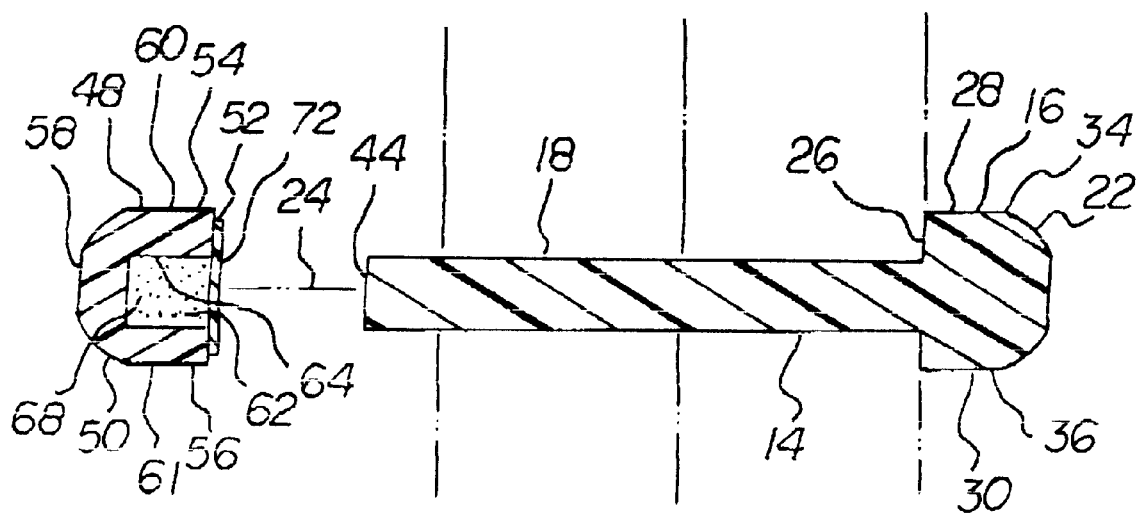
FIG. 2 is a cross-sectional view of the present invention taken along line 2—2 of FIG. 1.

With reference now to the drawings, and in particular to FIG. 1 thereof, the preferred embodiment of the new and improved plastic fastener system embodying the principles and concepts of the present invention and generally designated by the reference numeral 10 will be described.

The present invention, the plastic fastener system 10 is comprised of a plurality of components. Such components in their broadest context include a rigid plastic bolt, a nut, and an adhesive. Such components are individually configured and correlated with respect to each other so as to attain the desired objective.

First provided is a rigid plastic bolt 14. The rigid plastic bolt has an integrally fabricated head 16 externally. The rigid plastic bolt has a shaft 18. The head has a generally hemispherical exterior end 22. The head has a cental axis 24. The head also has a generally planar interior end 26. The head further has a top 28 and a bottom 30. The exterior end of the head has a radially circular flat region 32. The top and bottom of the head each have a flat gripping region 34, 36 axially lying in a plane parallel with each other and parallel with the axis. The shaft of the bolt extends from the interior end of the head. The shaft has a generally smooth cylindrical shape. The shaft has a central axis. The shaft also has a flat face 42. The flat face extends the length of the shaft. The flat face lies in a plane parallel with the axis and parallel with the flat gripping regions. The shaft terminates with a vertical free surface 44.

Next provided is a nut 48. The nut has a generally hemispherical exterior end 50. The nut also has a generally planar interior end 52. The nut further has a top 54 and a bottom 56. The exterior end of the nut has a radially circular flat region 58. The top and bottom each have a flat gripping region 60, 61 axially lying in a plane parallel with each other and parallel with the axis. The nut has a recess 62 in the interior end. The recess is in a generally circular configuration with a flat axial face 64. The flat axial face is adapted to receive the shaft. The shaft and the nut and their faces are sized and shaped whereby, when the shaft of the bolt is inserted into the recess of the nut, the various gripping regions of the nut and bolt and the flat portions of the shaft and aperture all lie in parallel planes.

An adhesive 68, functioning as a quick setting cement is provided next. The adhesive lines the interior surface of the recess of the nut. In this manner, a secure coupling between the nut and bolt is provided when the nut and bolt are brought into contact with each other.

Last provided is a fragile membrane 72, functioning as a break-away seal. The fragile membrane is in a circular configuration with a periphery 74. The fragile membrane is attached to the interior face of the nut adjacent to the recess. The membrane is adapted to be positioned over the recess to prevent drying of the adhesive prior to use. The membrane is further adapted to be penetrated by the free surface of the shaft during operation and use to access the adhesive and couple the nut and bolt.

Figure 3:
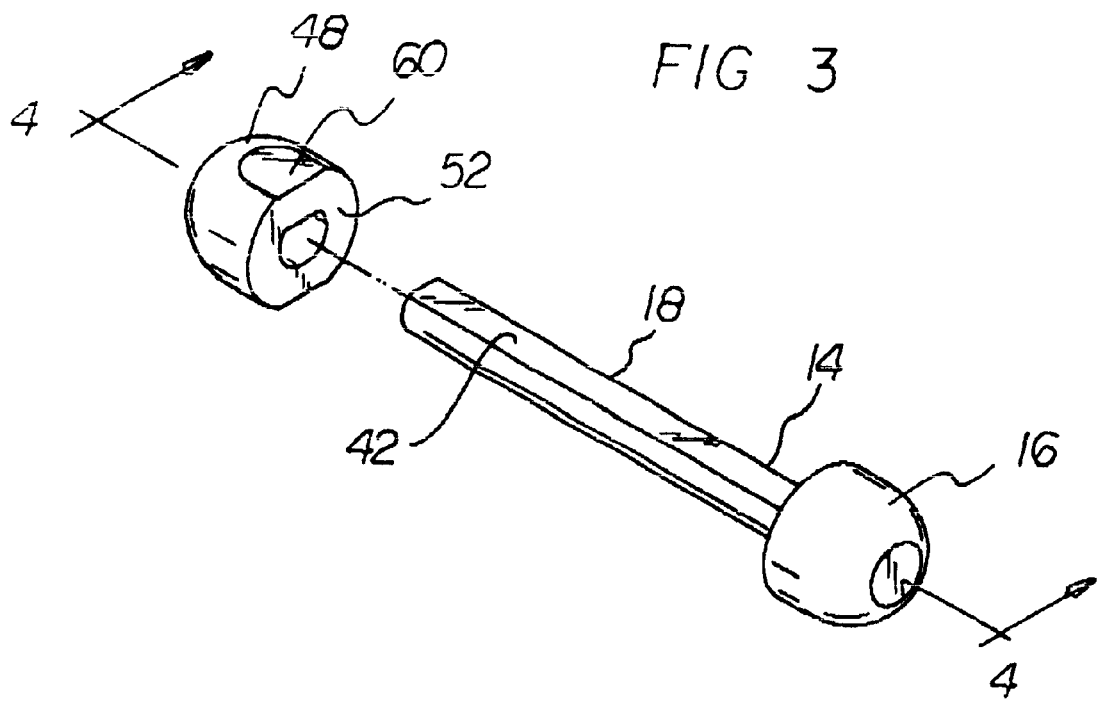
FIG. 3 is a perspective illustration of an alternative embodiment associated with the present invention with flats on one nut and with no membrane.
Figure 4:
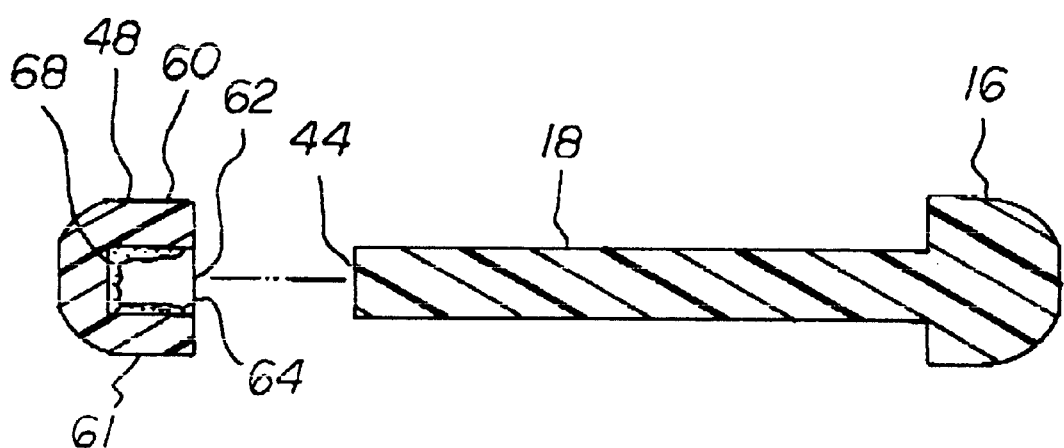
FIG. 4 is a cross-sectional view of the alternative embodiment associated with the present invention taken along line 4—4 of FIG. 3.

In an alternative embodiment of the present invention shown in FIGS. 3 and 4, the nut 48 has no membrane to preclude the attachment of the shaft with the nut. In this embodiment the adhesive 68 is positioned by a user inside the recess of the nut prior to coupling the shaft to the nut. FIG. 3 also shows the use of gripping regions 60, 61 only on the nut and not on the head 16.

Figure 5:
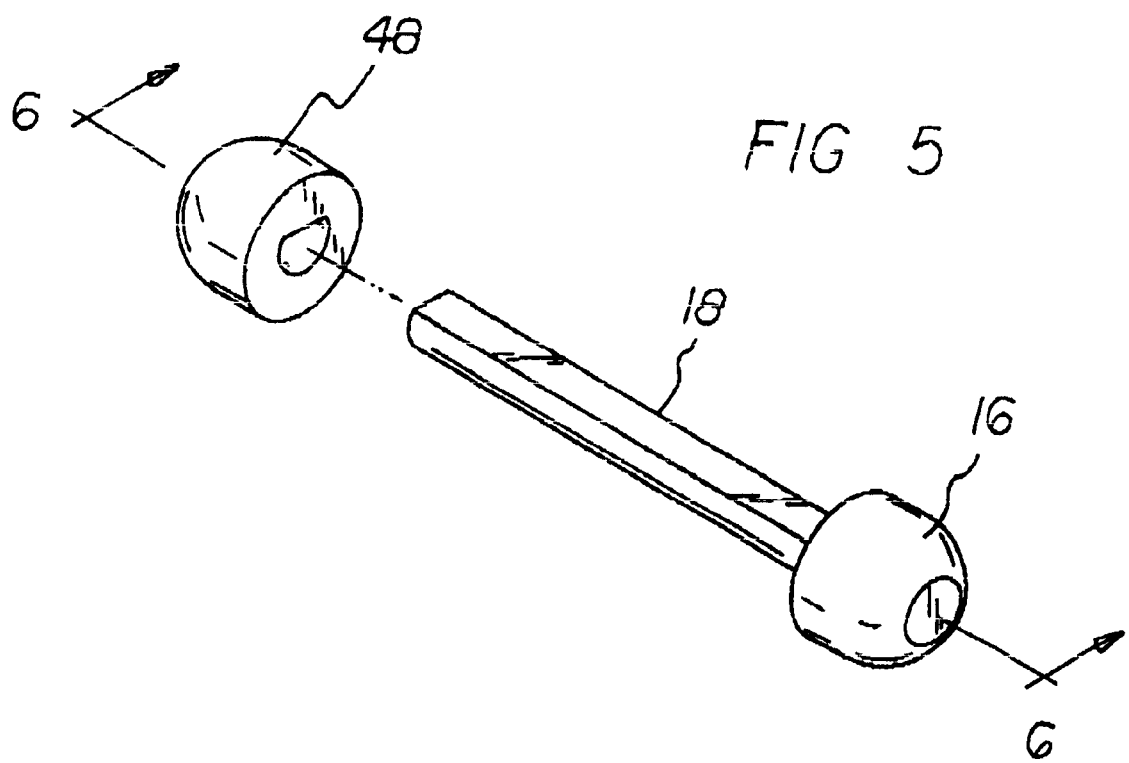
FIG. 5 is a perspective illustration of another alternative embodiment associated with the present invention but showing the shaft adapted to be cut to a predetermined length and with the nuts formed without flat regions.
Figure 6:
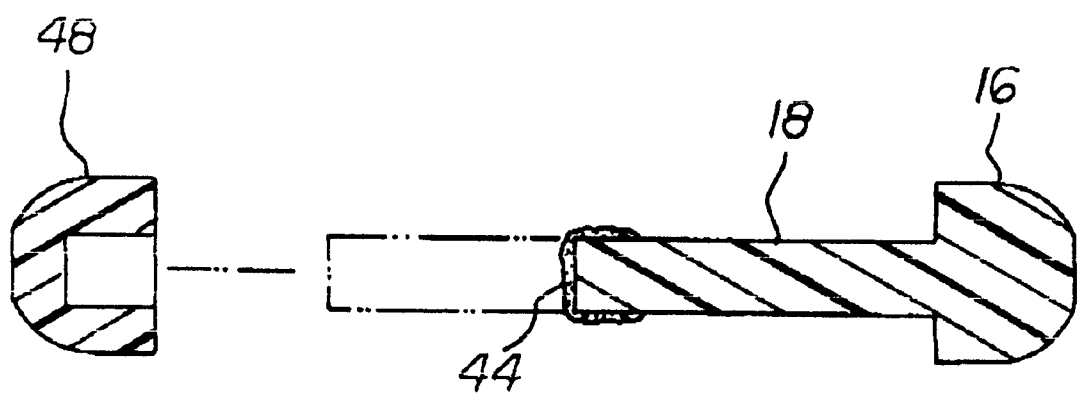
FIG. 6 is a cross sectional view of an alternative embodiment associated with the present invention taken along line 6—6 of FIG. 5, but illustrating the extended end of the shaft in dotted lines after the shaft has been cut to length.

In another alternative embodiment shown in FIGS. 5 and 6, the shaft is of a variable length. The shaft is cut to length for any particular application. The dotted line of FIG. 6 represent the end of the shaft which has been cut off to allow coupling of thinner plates. The adhesive 68 is placed by a user on the vertical free surface of the shaft. FIGS. 5 and 6 further shows use of no gripping surfaces on either the nut or bolt. Such flat gripping surfaces may be used or not used on any of the embodiments.

Figure 7:
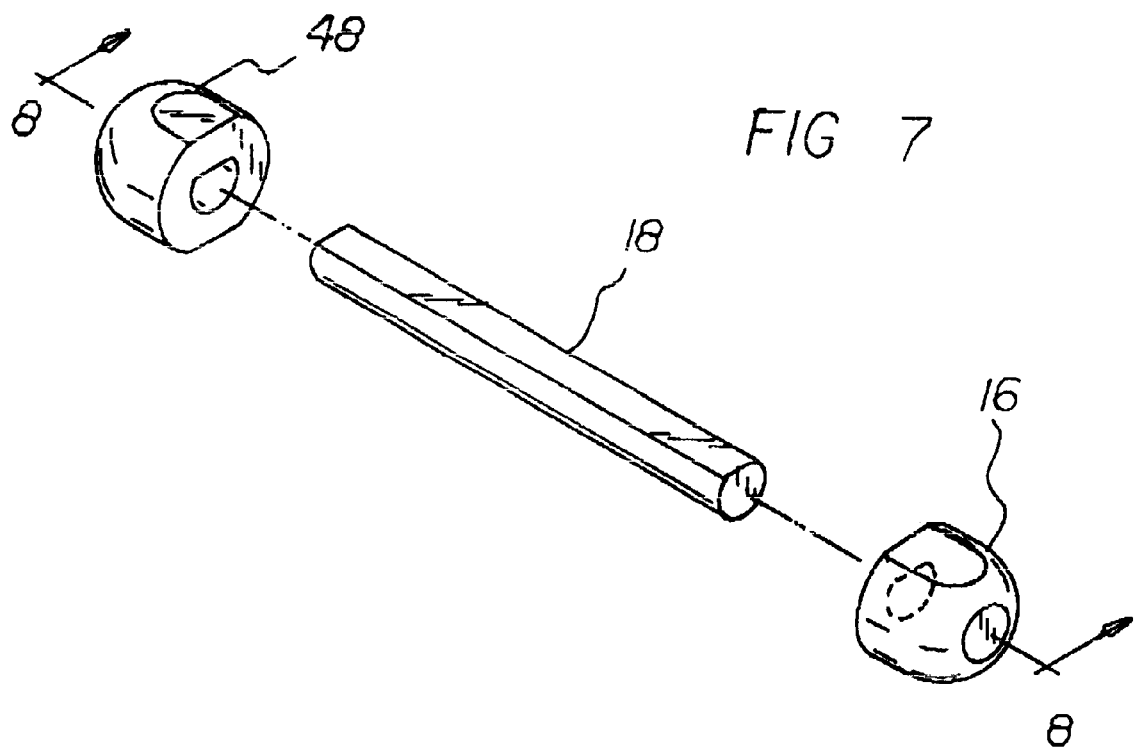
FIG. 7 is a perspective illustration of the final alternative embodiment associated with the present invention but with separate nuts at both ends.
Figure 8:
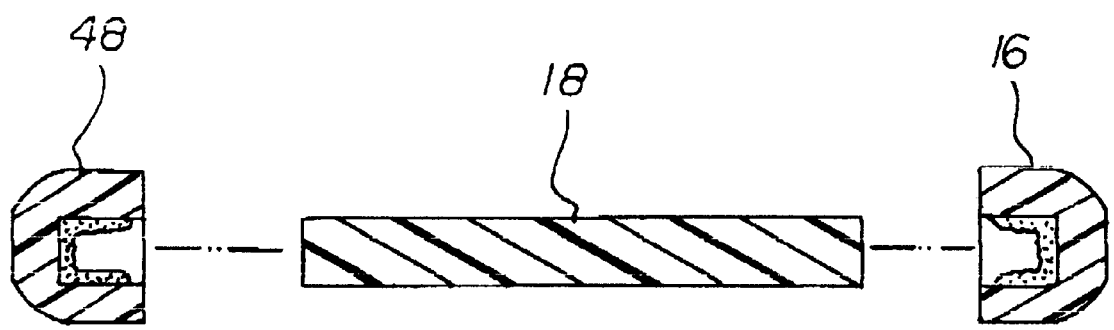
FIG. 8 is a cross sectional view of an alternative embodiment associated with the present invention taken along line 8—8 of FIG. 7.

A final embodiment of the present invention is shown in FIGS. 7 and 8. In such embodiment both the nut 42 and the head 16 of the bolt are independent of and couplable with the shaft 18. In these various embodiments, the various techniques for providing adhesive, either behind the membrane or within the recess or on the end of the shaft for any various application.

The fastener is made of an elastomeric material, such as plastic or rubber, natural or synthetic, or blend thereof whereby it is a partially flexible material.

The head of the bolt and cap is preferably constructed of two flat ends. Since the bolt itself has one flat end to prevent the bolt from twisting, it would be a lot easier to line up the flat side cap with the flat side of the head on the bolt. If you are working in a blind area where you can not see the bolt, it would be a lot easier to line the cap with the bolt as long as you are sure that the flat ends are lined up the same.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plastic fastener system for adhesively coupling non-threaded components comprising, in combination:

a rigid plastic bolt having an integrally fabricated head externally and shaft internally;

the head having a generally hemispherical exterior end with a cental axis and a generally planar interior end, the head further having a top and a bottom, the exterior end having a radially circular flat region, the top and bottom, each having a flat gripping region axially lying in a plane parallel with each other and parallel with the axis;

the shaft extending from the end of the head, the shaft having a generally smooth common cross sectional shape along it length with a central axis and with a flat face extending the length of the shaft, the flat face lying in a plane parallel with the axis and parallel with the flat gripping regions, the shaft terminates with a vertical free surface;

a cap having a closed generally hemispherical exterior end and an open generally planar interior end, the cap further having a top and a bottom, the exterior end having a radially circular flat region, the top and bottom each having a flat gripping region axially lying in a plane parallel with each other and parallel with the axis, the cap further having a recess in the interior end, the recess being of a generally common cross sectional configuration along its length with a flat axial face receiving the shaft, the shaft and recess having the same cross sectional shape, the shaft and the cap and their faces being sized and shaped whereby when the shaft of the bolt is inserted into the recess of the nut, the various gripping regions of the nut and bolt and the flat portions of the shaft and aperture all lie in parallel planes;

an adhesive lining the interior surface of the recess of the cap to provide a secure coupling between the cap and bolt when brought into contact with each other; and a fragile membrane in circular configuration with a periphery attached to the interior face of the cap adjacent to the recess and adapted to be positioned over the recess to prevent drying of the adhesive prior to use, the membrane further being adapted to be penetrated by the free surface of the shaft during operation and use to access the adhesive and couple the cap and bolt.

2. A fastener system for adhesively coupling non-threaded components comprising, in combination:

a rigid bolt having a head externally and shaft internally:

the head having a generally hemispherical exterior end with a cental axis and a generally planar interior end, the head further having a top and a bottom;

the bolt having a shaft with a common cross sectional shape along its length with a central axis and with a flat axial face lying in a plane parallel with the central axis;

a cap having a closed generally hemispherical exterior end and an open generally planar interior end, the cap further having a top and a bottom, the exterior end having a radially circular flat region, with a recess having a common cross sectional shape along its length with a flat axial face receiving the shaft, the shaft and recess having essentially the same cross sectional shape; and an adhesive to provide a secure coupling between the cap and bolt when brought into contact with each other.

3. The fastener system as set forth in claim 2 wherein the cap and the head of the bolt have a flat gripping region axially lying in a plane parallel with each other and parallel with the axis.

4. The fastener system as set forth in claim 2 wherein the exterior ends of the cap and the head of the bolt have a radially circular flat region.

5. The fastener system as set forth in claim 2 wherein the shaft has a generally cylindrical shape with a central axis and with a flat face extending the length of the shaft.

6. The fastener system as set forth in claim 2 further including a fragile membrane with a periphery attached to the interior face of the cap adjacent to the recess.

7. The fastener system as set forth in claim 2 wherein the adhesive lines the interior surface of the recess of the cap.

8. The fastener system as set forth in claim 2 wherein the adhesive lines the vertical free surface of the shaft.

9. The fastener system as set forth in claim 2 wherein the shaft length is varied and the shaft is adapted to be cut prior to coupling.

10. The fastener system as set forth in claim 2 wherein the head of the bolt has a recess to receive the shaft of the bolt.

11. The fastener system as set forth in claim 10 wherein adhesive lines the interior surface of the recess in the head of the bolt.

12. The fastener system as set forth in claim 11 wherein a membrane covers the recess in the head of the bolt.

13. A fastener system for adhesively coupling non-threaded components comprising, in combination:
   a rigid bolt having a head externally and cylindrical shaft internally;
   the head having a generally hemispherical exterior end with a cental axis and a generally planar interior end;
   the bolt having a shaft with a generally cylindrical shape with a central axis and with a flat axial face along its entire length in a plane parallel with the central axis;
   a cap having a generally hemispherical exterior end and a generally planar interior end, the head further having a top and a bottom, the cap further having a recess in the interior end, the recess being of a generally cylindrical configuration along its length with a flat axial face receiving the shaft, the shaft and recess having the same cross sectional shape;
   an adhesive lining the interior surface of the recess of the cap; and
   a fragile membrane with a periphery attached to the interior face of the cap adjacent to the recess.

14. The fastener system as set forth in claim 13 wherein the cap and the head of the bolt have a flat gripping region axially lying in a plane parallel with each other and parallel with the axis.

15. The fastener system as set forth in claim 13 wherein the exterior ends of the cap and the head of the bolt have a radially circular flat region.

16. The fastener system as set forth in claim 13 wherein the shaft has a generally cylindrical shape with a central axis and with a flat face extending the length of the shaft.

17. The fastener system as set forth in claim 13 wherein the shaft length is varied.

18. The fastener system as set forth in claim 13 wherein the head of the bolt has a recess to receive the shaft of the bolt.

19. The fastener system as set forth in claim 18 wherein adhesive lines the interior surface of the recess in the head of the bolt.

20. The fastener system as set forth in claim 19 wherein a membrane covers the recess in the head of the bolt.

* * * * *